(12) United States Patent
Magunia et al.

(10) Patent No.: US 6,613,865 B1
(45) Date of Patent: Sep. 2, 2003

(54) THERMOPLASTIC DESICCANT

(75) Inventors: Robert Magunia, Elztal-Dallau (DE); Gerald Petry, Hueckelhoven (DE); Michael Krebs, Hilden (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/111,797

(22) PCT Filed: Oct. 20, 2000

(86) PCT No.: PCT/EP00/10327

§ 371 (c)(1),
(2), (4) Date: Apr. 26, 2002

(87) PCT Pub. No.: WO01/32531

PCT Pub. Date: May 10, 2001

(30) Foreign Application Priority Data

Oct. 29, 1999 (DE) .......................................... 199 52 089

(51) Int. Cl.⁷ ......................................... C08G 18/10
(52) U.S. Cl. ........................... 528/59; 53/400; 53/449; 252/194; 528/53; 528/56; 34/329; 521/159
(58) Field of Search ................... 53/400, 449; 252/194; 528/53, 56, 59; 34/329; 521/159

(56) References Cited

U.S. PATENT DOCUMENTS

| | | | |
|---|---|---|---|
| 4,195,009 A | 3/1980 | Zimmermann | 260/31.2 |
| 5,802,815 A | 9/1998 | Lohr et al. | 53/440 |
| 5,900,226 A | 5/1999 | House | 423/700 |
| 5,932,680 A | 8/1999 | Heider | 528/59 |
| 6,080,350 A | * | 6/2000 | Hekal |

FOREIGN PATENT DOCUMENTS

| | | |
|---|---|---|
| DE | 36 05 422 | 8/1987 |
| DE | 44 04 631 | 8/1995 |
| DE | 197 22 789 | 12/1998 |
| EP | 0 413 049 | 2/1991 |
| EP | 0 582 968 | 2/1994 |
| JP | 07-48546 | 2/1995 |
| JP | 02-760769 | 3/1998 |
| WO | WO 99/63288 | 12/1999 |

* cited by examiner

*Primary Examiner*—Rachel Gorr
(74) *Attorney, Agent, or Firm*—Stephen D. Harper; Arthur G. Seifert

(57) ABSTRACT

The invention relates to thermoplastic compositions that contain reactive isocyanate groups and that are suitable for use as desiccants for packaging moisture-sensitive goods, especially for polyurethane hotmelt adhesives that are cross-linked upon exposure to moisture. The compositions are formed by the reaction of hydroxy- or amino-containing polyols, including sugars, with an excess of polyisocyanates, and admixing the resulting product with polyurethane catalysts.

42 Claims, No Drawings

THERMOPLASTIC DESICCANT

BACKGROUND OF THE INVENTION

1. Field of the Invention

This invention relates to the use of thermoplastic polymer compositions containing reactive isocyanate groups as a drying agent for protecting moisture-sensitive goods.

Various goods and products of everyday life have to be protected against moisture, more particularly moisture from the surrounding atmosphere. These include in particular highly reactive one-component moisture-curing adhesive systems such as, for example, one-component moisture-curing polyurethane adhesives, moisture-curing systems based on reactive silane groups and the like.

2. Description of the Related Art

A typical method of protecting such moisture-sensitive reactive adhesive/sealant systems comprises packing them in water-impermeable containers such as, for example, flanged metal cartridges, airtight drums or casks, optionally using inner packs of laminated films consisting of a layer of metal foil and one or more layers of plastic films. Packs such as these are described, for example, in DE-A-3605422, EP-A-413049 or in DE-U-9912012.

Moisture-reactive polyurethane hotmelts are particularly sensitive to moisture. It is known that moisture-sensitive polyurethane hotmelts are produced in such a way that they contain very few reactive isocyanate groups which react even with traces of moisture and form crosslinked infusible polymers. Accordingly, moisture-sensitive polyurethane hotmelts have to be packed and stored in the strict absence of moisture, as illustrated by the following example: in order completely to harden 1 kg of a polyurethane hotmelt with an isocyanate content of 1%, i.e. to react all the isocyanate groups, takes ca. 1 gram of water. Accordingly, a skin is formed on the surface of such a hotmelt even if only fractions of this amount of water pass to the surface of the product.

Consequently, where moisture-sensitive polyurethane hotmelts are packed in drums, casks, cartridges or laminated film bags, even traces of penetrating moisture are sufficient to render the entire contents of the container unusable through skin formation.

In order to achieve a shelf life of 9 months or longer for a packed polyurethane hotmelt, the imperviousness of the packs has to meet very stringent requirements, particularly in regard to the tightness of the seal used and the dimensional stability of the container. Since the tightness of the container can never be satisfactorily tested, even with 100% incoming goods control, it happens fairly frequently in the present state of the art that individual containers are only detected as leaky after they have been filled with the hotmelt. It is a serious disadvantage that the customer and user is also unable to detect such faulty packs because the crosslinked infusible skin is difficult to tell apart from the uncrosslinked fusible reactive hotmelt at room temperature. Although it is possible to melt the surface every time the container is changed in order to assess whether a skin has already formed, this is a labor-intensive and time-consuming step, especially since in industrial application very little time is generally available for changing containers. As a rule, the processor only notices skin formation in the container through a steep fall in the quantity of hotmelt delivered through the installation. Since the crosslinked skin can block the throughflow pipes, faulty bonding and expensive, time-consuming breaks in production are the outcome.

There has been no shortage of attempts to develop suitable packs for reactive polyurethane hotmelts where the skin formation and surface hardening mentioned above are avoided. Thus, DE-A-4404631 describes a process for the self-sealing of containers in which moisture-sensitive fusible materials, such as polyurethane hotmelts for example, are covered with an insert consisting of a heat-resistant plastic film impermeable to water vapor and a plastic disk of a thermoplastic material with a linear expansion coefficient of $6.10^{-5}/K$. This cover enables the surface of such moisture-sensitive fusible materials to be self-sealed. In addition, in one particular embodiment of the process in question, a small bag filled with molecular sieve as a moisture adsorber is placed on the insert after the fusible material has been sealed and the container is then closed with a lid.

The use of molecular sieves, silica gels or sharply dried, hygroscopic inorganic salts with a tendency towards hydrate formation as a water collector or water adsorber has been repeatedly proposed in the prior art, cf. DE-A-19722789, US-A-5900226, JP-02760769 B2 or JP-07048546 A.

All these adsorbers are either used to dry the raw materials used or are incorporated in the pack as a drying agent. For the second of these two applications, however, the adsorbers in question perform their function to only a very limited extent. This is because the adsorption of water onto molecular sieves, silica gels or inorganic salts containing water of crystallization is reversible, i.e. the water initially adsorbed desorbs again and is then able to react irreversibly with the reactive groups, such as the isocyanate groups, of a polyurethane hotmelt adhesive in a crosslinking reaction. This water is thus irreversibly removed from the adsorption/desorption equilibrium and ultimately leads to optionally complete crosslinking of the packed material.

Accordingly, there is still a need to find improved ways of protecting moisture-sensitive goods.

BRIEF SUMMARY OF THE INVENTION

The solution to this problem as provided by the invention is defined in the claims and consists essentially in the use of thermoplastic polymer compositions containing reactive isocyanate groups as a drying agent in the packaging of moisture-sensitive goods.

In a preferred embodiment, these thermoplastic polymers have a content of reactive NCO groups of 0.3 to 20% by weight and preferably 0.6 to 15% by weight, based on the composition as a whole.

DETAILED DESCRIPTION OF THE INVENTION

Reactive polymers of the type in question may be obtained in known manner by reacting compounds or polymers containing OH or amino groups with an excess of polyisocyanates. These polyisocyanates should preferably have a high reactivity so that aromatic polyisocyanates are preferably used. The crude technical isomer and homolog mixture of diphenyl methane diisocyanate (MDI) is particularly suitable from the cost perspective. Suitable polyols are polyester polyols or polyether polyols solid at room temperature with a melting point below 150° C. or fusible mixtures of polyester polyols, polyether polyols and sugars. Examples of sugars are mainly the monosaccharides or oligosaccharides such as, for example, glucose, galactose, mannose, fructose, arabinose, xylose, ribose or even cane sugar. In principle, other low molecular weight polyols or polyamines may also be at least partly used. It is important in this regard that the reaction product of polyisocyanate and polyalcohol is still fusible at temperatures below 180° and preferably below 130° so that it may readily be converted into the "surface-rich" form. In order to achieve a high water adsorption capacity, the polyisocyanate is preferably used in a large stoichiometric excess. Chemically non-bound polyisocyanate is physically fixed in the solidifying matrix of the thermoplastic drying agent. After reacting off with water in the function of the moisture scavenger, the chemically non-bound polyisocyanate is chemically irreversibly bound to the drying agent, thus avoiding health hazards from unreacted monomeric isocyanate at the time of disposal of the thermoplastic polymer. Where polyisocyanates of relatively high functionality, such as crude MDI, or sugars are used, it can be useful to add monohydric $C_{1-12}$ alcohols or corresponding secondary amines as chain terminators in order to prevent a high degree of crosslinking of the reaction mixture and hence the formation of a thermoset.

In order to obtain high reactivity of the drying agent to moisture, particularly preferred embodiments of the thermoplastic polymer drying agent compositions according to the invention have to be provided with a relatively large content of polyurethane catalysts.

Suitable catalysts are any of the various known polyurethane catalysts including, for example, tin(II) salts of carboxylic acids, such as tin(II) acetate, ethylhexoate and diethylhexoate, or dialkyltin(IV) carboxylates of which the carboxylic acids contain at least 2, preferably at least 10 and more particularly 14 to 32 carbon atoms. Dicarboxylic acids may also be used. The following are expressly mentioned as acids: adipic acid, maleic acid, fumaric acid, malonic acid, succinic acid, pimelic acid, terephthalic acid, phenylacetic acid, benzoic acid, acetic acid, propionic acid and in particular 2-ethylhexanoic, caprylic, capric, lauric, myristic, palmitic and stearic acid. Actual compounds are dibutyl and dioctyl tin diacetate, maleate, bis-(2-ethylhexoate), dilaurate, tributyl tin acetate, bis-(β-methoxycarbonylethyl)-tin dilaurate and bis-(β-acetylethyl)-tin dilaurate.

Tin oxides and sulfides and thiolates may also be used. Actual compounds are bis-(tributyltin)-oxide, bis-(trioctyltin)-oxide, dibutyl and dioctyl tin bis-(2-ethylhexylthiolate), dibutyl and dioctyl tin didoceyl thiolate, bis-(β-methoxycarbonylethyl)-tin didodecyl thiolate, bis-(β-acetylethyl)-tin-bis-(2-ethylhexylthiolate), dibutyl and dioctyl tin didoceyl thiolate, butyl and octyl tin tris-(thioglycolic acid-2-ethylhexoate), dibutyl and dioctyl tin bis-(thioglycolic acid-2-ethylhexoate), tributyl and trioctyl tin-(thioglycolic acid-2-ethyl hexoate) and butyl and octyl tin tris-(thioethyleneglycol-2-ethylhexoate), dibutyl and dioctyl tin bis-(thioethylenegeglycol-2-ethylhexoate), tributyl and trioctyl tin-(thioethyleneglycol-2-ethylhexoate) with the general formula $R_{n+1}Sn(SCH_2CH_2OCOC_8H_{17})_{3-n}$, where R is a $C_{4-8}$ alkyl group, bis-(β-methoxycarbonylethyl)-tin-bis-(thioethyleneglycol-2-ethylhexoate), bis-(β-methoxycarbonylethyl)-tin-bis-(thioglycoli acid-2-ethylhexoate), bis-(β-acetylethyl)-tin-bis-(thioethyleneglycol-2-ethylhexoate) and bis-(β-acetylethyl)-tin-bis-(thioglycolic acid-2-ethylhexoate).

Other suitable catalysts are aliphatic tertiary amines, more particularly with a cyclic structure. Among the tertiary amines, those which additionally contain isocyanate-reactive groups, more particularly hydroxyl and/or amino groups, are also suitable. Specific examples of such tertiary amines are dimethyl monoethanolamine, diethyl monoethanolamine, methyl ethyl monoethanolamine, triethanolamine, trimethanolamine, tripropanolamine, tributanolamine, trihexanolamine, tripentanolamine, tricyclohexanolamine, diethanol methyl amine, diethanol ethyl amine, diethanol propyl amine, diethanol butyl amine, diethanol pentyl amine, diethanol hexyl amine, diethanol cyclohexyl amine, diethanol phenyl amine and ethoxylation and propoxylation products thereof, diazabicyclooctane (Dabco), triethyl amine, dimethyl benzyl amine (Desmorapid DB, BAYER AG), bis-dimethylaminoethyl ether (Catalyst A 1, UCC), tetramethyl guanidine, bis-dimethylaminomethylphenol, 2,2'-dimorpholinodiethyl ether (DMDEE), 2-(2-dimethylaminoethoxy)-ethanol, 2-dimethylaminoethyl-3-dimethylaminopropyl ether, bis-(2-dimethylaminoethyl)-ether, N.N-dimethyl piperazine, N-(2-hydroxyethoxyethyl)-2-azanorbornane, Texacat DP-914 (Texaco Chemical), N,N,N,N-tetramethylbutane-1,3-diamine, N,N,N,N-tetramethylpropane-1,3-diamine, N,N,N,N-tetramethylhexane-1,6-diamine, 1-methylimidazole, 2-methyl-1-vinyl imidazole, 1-allyl imidazole, 1-phenylimidazole, 1,2,4,5-tetramethylimidazole, 1-(3-aminopropyl)-imidazole, pyrimidazole, 4-dimethylaminopyridine, 4-pyrrolidinopyridine, 4-morpholinopyridine, 4-methyl pyridine and N-dodecyl-2-methyl imidazole.

Particularly preferred catalysts are those which favor the isocyanate/water reaction over all other reactions of the NCO group. Such catalysts are in particular the cyclic and tertiary amino compounds, optionally in conjunction with tin compounds. The catalysts are used in a concentration of 0.05 to 15% by weight and more particularly 0.5 to 10% by weight, based on the sum of hydroxyl compounds and polyisocyanate.

It is important that the starting components and the production process for the drying agent according to the invention are selected so that, after reaction of the isocyanate groups with the hydroxyl groups or amino groups, the composition is still thermoplastic in character so that it can readily be made up by shaping in such a way that a large surface is available for the chemical adsorption of water. In a particularly preferred embodiment, the composition is made up into fine granules, thin flakes, a thin extruded film or an open-cell foam. Another embodiment of the drying agent according to the invention can be produced by spinning/spraying so that a kind of nonwoven material similar to a textile fleece or knitted fabric is formed.

The moisture-reactive thermoplastic drying agent thus produced is then placed in a moisture-proof container and arranged outside the moisture-sensitive product to be protected. In this moisture-proof container, the drying agent according to the invention acts like a "sacrificial hotmelt", i.e. the isocyanate groups bound therein are sacrificed to absorb the moisture present in the surrounding atmosphere so that the moisture-sensitive product is protected against reaction with moisture. In a cask, drum or cartridge, this may be the air gap above the product to be protected, for example a moisture-curing hotmelt adhesive in the gap between the surface of the adhesive and the lid of the container. If the moisture-sensitive product to be protected, for example a preformed hotmelt adhesive, is directly welded or sealed in a bag of laminated film, the thermoplastic drying agent made up as described above may also be introduced into and welded or sealed in the remaining air gap of the pack.

The invention is illustrated by the following Examples. These Examples which do not cover the entire scope of the invention which is defined in the claims.

EXAMPLES

A hotmelt-adhesive-like material was produced from a polyester polyol and crude MDI. 0.5% by weight of DMDEE catalyst was then added. The material was then melted at about 120°, applied to a laminated film consisting of polyethylene (PE), aluminium and polyester (PES) on the PES side and then covered with a second identical film, but this time on the PE side. This laminate was then rolled to a thickness of ca. 2 mm and cooled. Square pieces with a side length of ca. 100 mm were then diecut from the laminate and welded individually in laminated aluminium foil pending use.

A polyurethane hotmelt adhesive (Macromelt QR 5300) was packed in the usual way in drums with aluminium in-liners. The in-liners were then welded and the whole was cooled. After the hotmelt adhesive had cooled and thus solidified, it was end-packed. For this purpose, the in-liner was re-opened and a piece of the thermoplastic drying agent described above was applied to one side of a film as support, placed on the adhesive and a vacuum was applied. The container was either evacuated and then closed or was only closed. The non-evacuated film bags were intended to simulate leaky containers. The four film bags were subjected to a changing climate test for six weeks with the following results:

| | |
|---|---|
| Evacuated film bag containing drying agent according to the invention | Drying agent slightly crosslinked, product o.k. |
| Film bag containing drying agent according to the invention, leaky (without vacuum) | Drying agent crosslinked, product o.k. |
| Film bag tight (vacuum) without drying agent | Product o.k. |
| Film bag leaky (without vacuum), no drying agent | Product crosslinked, i.e. unusable |

It is clear from the above-mentioned storage tests in changing climatic conditions that the drying agent according to the invention provides a distinct improvement over the prior art. Even with leaky containers, the shelf life of the packed hotmelt adhesive, i.e. to the point where it becomes unusable, is clearly prolonged.

What is claimed is:

1. A process for protecting packaged, moisture-sensitive goods from moisture, comprising providing within such package a thermoplastic polymer composition containing reactive isocyanate groups as a drying agent, wherein said thermoplastic polymer composition is produced by the reaction of polymers containing hydroxy or amino groups with an excess of polyisocyanates.

2. A process according to claim 1 wherein such polymers containing hydroxy groups are selected from polyester polyols, or polyether polyols or mixtures thereof, which are solid at room temperatures and have a melting point below 150° C., or from fusible mixtures of polyester polyols, polyether polyols and sugars.

3. A process according to claim 2 wherein the sugars are selected from monosaccharides and oligosaccharides.

4. A process according to claim 2 wherein the sugars are selected from glucose, galactose, mannose, fructose, arabinose, xylose, ribose and cane sugar or mixtures thereof.

5. A process according to claim 2 wherein a further reactant comprises one or more low molecular weight polyols or polyamines or mixtures thereof.

6. A process according to claim 1 wherein the polyisocyanate reactant is in large stoichiometric excess.

7. A process according to claim 1 wherein the polyisocyanate comprises diphenyl methane diisocyanate (MDI).

8. A process according to claim 1 wherein a further reactant comprises a monohydric $C_{1-2}$ alcohol or a corresponding secondary amine.

9. A process according to claim 1 wherein the thermoplastic polymer composition further includes one or more polyurethane catalysts.

10. A process according to claim 9 wherein such polyurethane catalysts are present in a concentration of 0.05 to 15% by weight based on the sum of the hydroxy compounds and polyisocyanate.

11. A process according to claim 9 wherein such polyurethane catalysts are selected from tin (II) salts of carboxylic acids, tin oxides, tin sulfides, tin thiolates, aliphatic tertiary amines and mixtures thereof.

12. A process according to claim 9 wherein such polyurethane catalysts are selected from cyclic and tertiary amino compounds, optionally in conjunction with tin compounds.

13. A process according to claim 1 wherein the thermoplastic polymer composition is obtained in form of granules, thin flakes, a thin extruded film, or an open-cell foam.

14. A process according to claim 1 wherein thermoplastic polymer composition is produced by a spinning or spraying technique whereby it forms a nonwoven material similar to textile fleece or a knitted fabric.

15. A process according to claim 1 wherein the goods to be protected from moisture comprise a polyurethane hotmelt adhesive.

16. A process according to claim 1 wherein the goods to be protected and the thermoplastic polymer composition are contained in a moisture-proof package and the thermoplastic polymer composition is arranged therein outside of the goods.

17. A process for protecting packaged, moisture-sensitive goods from moisture, comprising providing within such package a thermoplastic polymer composition containing reactive isocyanate groups as a drying agent, wherein said thermoplastic polymer composition is produced by the reaction of polymers containing hydroxy or amino groups with an excess of polyisocyanates and thereafter admixing such reaction product with one or more polyurethane catalysts.

18. A process according to claim 17 wherein such polymers containing hydroxy groups are selected from polyester polyols, or polyether polyols or mixtures thereof, which are solid at room temperatures and have a melting point below 1 50° C., or from fusible mixtures of polyester polyols, polyether polyols and sugars.

19. A process according to claim 18 wherein the sugars are selected from glucose, galactose, mannose, fructose, arabinose, xylose, ribose and cane sugar or mixtures thereof.

20. A process according to claim 17 wherein the polyisocyanate reactant is in large stoichiometric excess.

21. A process according to claim 17 wherein the polyisocyanate comprises diphenyl methane diisocyanate (MDI).

22. A process according to claim 17 wherein a further reactant comprises a monohydric $C_{1-12}$ alcohol or a corresponding secondary amine.

23. A process according to claim 17 wherein such polyurethane catalysts are present in a concentration of 0.05 to 15% by weight based on the sum of the hydroxy compounds and polyisocyanate.

24. A process according to claim 17 wherein such polyurethane catalysts are selected from tin (II) salts of carboxylic acids, tin oxides, tin sulfides, tin thiolates, aliphatic tertiary amines and mixtures thereof.

25. A process according to claim 17 wherein such polyurethane catalysts are selected from cyclic and tertiary amino compounds, optionally in conjunction with tin compounds.

26. A process according to claim 17 wherein the thermoplastic polymer composition is obtained in form of granules, thin flakes, a thin extruded film, or an open-cell foam.

27. A process according to claim 17 wherein thermoplastic polymer composition is produced by a spinning or spraying technique whereby it forms a nonwoven material similar to textile fleece or a knitted fabric.

28. A process according to claim 17 wherein the goods to be protected from moisture comprise a polyurethane hotmelt adhesive.

29. A process according to claim 17 wherein the goods to be protected and the thermoplastic polymer composition are contained in a moisture-proof package and the thermoplastic polymer composition is arranged therein outside of the goods.

30. A process for protecting packaged, moisture-sensitive goods from moisture, comprising providing the goods contained in a moisture-proof package together with a thermoplastic polymer composition containing reactive isocyanate groups as a drying agent, wherein said thermoplastic polymer composition is produced by the reaction of polymers containing hydroxy or amino groups with an excess of polyisocyanates.

31. A process according to claim 30 wherein the thermoplastic polymer composition is outside of the moisture-sensitive goods.

32. A process according to claim 30 wherein such polymers containing hydroxy groups are selected from polyester polyols, or polyether polyols or mixtures thereof, which are solid at room temperatures and have a melting point below 150° C., or from fusible mixtures of polyester polyols, polyether polyols and sugars.

33. A process according to claim 32 wherein the sugars are selected from glucose, galactose, mannose, fructose, arabinose, xylose, ribose and cane sugar or mixtures thereof.

34. A process according to claim 32 wherein the polyisocyanate reactant is in large stoichiometric excess.

35. A process according to claim 30 wherein the polyisocyanate comprises diphenyl methane diisocyanate (MDI).

36. A process according to claim 30 wherein a further reactant comprises one or more a low molecular weight polyols or polyamines or mixtures thereof.

37. A process according to claim 30 wherein the thermoplastic polymer composition further includes one or more polyurethane catalysts in a concentration of 0.05 to 15% by weight based on the sum of the hydroxy compounds and polyisocyanate.

38. A process according to claim 37 wherein such polyurethane catalysts are selected from tin (II) salts of carboxylic acids, tin oxides, tin sulfides, tin thiolates, aliphatic tertiary amines and mixtures thereof.

39. A process according to claim 37 wherein such polyurethane catalysts are selected from cyclic and tertiary amino compounds, optionally in conjunction with tin compounds.

40. A process according to claim 30 wherein the thermoplastic polymer composition is obtained in form of granules, thin flakes, a thin extruded film, or an open-cell foam.

41. A process according to claim 30 wherein thermoplastic polymer composition is produced by a spinning or spraying technique whereby it forms a nonwoven material similar to textile fleece or a knitted fabric.

42. A process according to claim 30 wherein the goods to be protected from moisture comprise a polyurethane hotmelt adhesive.

* * * * *

UNITED STATES PATENT AND TRADEMARK OFFICE
CERTIFICATE OF CORRECTION

PATENT NO. : 6,613,865 B1
DATED : September 2, 2003
INVENTOR(S) : Magunia et al.

It is certified that error appears in the above-identified patent and that said Letters Patent is hereby corrected as shown below:

<u>Title page,</u>
Item [57], ABSTRACT,
Line 6, delete "hydroxy-" and insert -- hydroxyl --.

<u>Column 6,</u>
Line 41, delete "1 50º C." and insert -- 150º C. --.

Signed and Sealed this

Fourteenth Day of February, 2006

JON W. DUDAS
*Director of the United States Patent and Trademark Office*